(12) United States Patent
Guàrdia

(10) Patent No.: US 11,590,675 B2
(45) Date of Patent: Feb. 28, 2023

(54) CUTTING TOOL FOR A CERAMIC CUTTING DEVICE, A CUTTING-WHEEL HANDLE HOLDER, A CUTTING ASSEMBLY AND A CERAMIC CUTTING DEVICE

(71) Applicant: CORTAG INDÚSTRIA E COMÉRCIO LTDA, Mogi Mirim (BR)

(72) Inventor: Leonardo Guàrdia, Mogi Mirim (BR)

(73) Assignee: Cortag Industria e Comercio LTDA, Mogi Mirim (BR)

( * ) Notice: Subject to any disclaimer, the term of this patent is extended or adjusted under 35 U.S.C. 154(b) by 637 days.

(21) Appl. No.: 15/739,315

(22) PCT Filed: Mar. 23, 2016

(86) PCT No.: PCT/IB2016/051632
§ 371 (c)(1),
(2) Date: Dec. 22, 2017

(87) PCT Pub. No.: WO2016/207738
PCT Pub. Date: Dec. 29, 2016

(65) Prior Publication Data
US 2018/0297237 A1    Oct. 18, 2018

(30) Foreign Application Priority Data

Jun. 25, 2015   (BR) .......................... 102015015363-5

(51) Int. Cl.
*B28D 1/22*   (2006.01)
(52) U.S. Cl.
CPC ...... *B28D 1/225* (2013.01); *B23B 2231/2097* (2013.01)

(58) Field of Classification Search
CPC .......... B28D 1/22; B28D 1/225; B28D 1/226; B28D 1/223; B28D 1/228; B23B 2231/2097; B23D 45/02; B28B 17/0027
(Continued)

(56) References Cited

U.S. PATENT DOCUMENTS 4,672,874 A * 6/1987 Gach ...................... B28D 1/225
30/164.95
7,013,785 B2 * 3/2006 Torrents I Comas .. B28D 1/225
125/23.02
(Continued)

FOREIGN PATENT DOCUMENTS

EM  002200105-0001    6/2015
EM  002203133-0004    6/2015
(Continued)

OTHER PUBLICATIONS

Popma, Ronald, "International Search Report," prepared for PCT/IB2016/051632, dated Jun. 10, 2016, three pages.

*Primary Examiner* — Lee D Wilson
*Assistant Examiner* — Alberto Saenz
(74) *Attorney, Agent, or Firm* — Henry Patent Law Firm PLLC

(57) ABSTRACT

A cutting tool includes a cutting-wheel handle with an uniform cross-section with an outer contour including points arranged following two opposed straight rows and points arranged following one or more curved line segment of the edge of a circle enclosing an area into which the opposed straight rows lie and a cutting wheel mounted on the cutting-wheel handle to rotate along a rotation plane parallel or substantially parallel to the two opposed straight rows. A cutting-wheel handle holder has a body including a through hole for the insertion therethrough of the cutting-wheel handle, to a cutting assembly including the cutting tool and the cutting-wheel handle holder, and to a ceramic cutting (Continued)

device including the cutting assembly pivotably mounted to a support movably mounted on longitudinal guides mounted to a base.

7 Claims, 5 Drawing Sheets

(58) Field of Classification Search
USPC .......................... 125/23.01, 23.02; 225/96.5
See application file for complete search history.

(56) References Cited

U.S. PATENT DOCUMENTS

| | | | |
|---|---|---|---|
| D742,944 S | * | 11/2015 | Baro Cabrero .............. D15/127 |
| 2003/0047056 A1 | | 3/2003 | Torrents I Comas |
| 2014/0238376 A1 | * | 8/2014 | Courtemanche ....... B28D 1/225 |
| | | | 125/23.01 |
| 2015/0086291 A1 | * | 3/2015 | Baro Cabrero ......... B23B 31/20 |
| | | | 411/72 |

FOREIGN PATENT DOCUMENTS

| | | |
|---|---|---|
| EP | 0592345 A2 | 4/1994 |
| ES | 592345 A2 * | 4/1994 |
| MX | 42228 | 10/2014 |

* cited by examiner ion has CUTTING TOOL FOR A CERAMIC
CUTTING DEVICE, A CUTTING-WHEEL
HANDLE HOLDER, A CUTTING ASSEMBLY
AND A CERAMIC CUTTING DEVICE

CROSS-REFERENCE TO RELATED
APPLICATIONS

This application is a national stage entry under 35 USC § 371(b) of International Patent Application No. PCT/BR2016/051632, filed Mar. 23, 2016, and claims the benefit of Brazilian Patent Application No. 20151015363, filed on Jun. 25, 2015, both of which are expressly incorporated by reference herein.

TECHNICAL FIELD

The present invention concerns, in a first aspect, to a cutting tool for a ceramic cutting device, comprising a cutting-wheel handle which has an outer contour combining surfaces with different geometric shapes so arranged with respect to each other to provide, among other benefits, a firm fixation of the cutting-wheel handle into a through hole of a holder of the ceramic cutting device and a high cutting parallelism.

A second aspect of the invention concerns to a cutting-wheel handle holder comprising the cutting tool of the first aspect of the invention.

A third aspect of the invention concerns to a cutting assembly comprising the cutting tool of the first aspect and the cutting-wheel handle holder of the second aspect of the invention.

A fourth aspect of the invention concerns to a ceramic cutting device comprising the cutting assembly of the third aspect of the invention.

STATE OF THE ART

Manual ceramic cutting devices are generally constructed from a base for accurate positioning of a ceramic piece to be cut, where width and length can be adjusted on that base, and comprises a double rail or parallel longitudinal bars that allow the guided displacement of a pivoting head containing a tool-holder which holds a cutting tool, also with an adjustable positioning, which comprises a handle and a cutting-wheel mounted at an end thereof and made of a hard metal.

Such manual devices, unlike electrical devices, do not produce the section of the ceramic piece, but produces only a cutting line or cutting groove of little deepness, similarly to glass cutting, in which the operator needs to apply a breaking effort in order to separate the desired portions, well over the cutting groove that prevents the appearance of chips in the surface of the ceramic piece edges.

The cutting technique requires the operator to determine the Cartesian lines he/she wants to follow to cut, and define these values in synchrony with the position of the cutting-wheel, and sliding it with a certain pressure along the entire length of the cutting line.

To that end, it is necessary that the pivoting head that holds the cutting-wheel assembly, be able to tilt to such a degree, in both directions, such that the cutting-wheel handle can be moved within a through hole of the holder in both directions with the purpose of not touching the ceramic piece, for the introducing/retrieval operation, or to approximate to the ceramic piece for the cutting operation.

The manual cutting devices for ceramic materials, such as tiles and floors, using a carbide cutting wheel, present some drawbacks as to the correct positioning of the cutting-wheel and thus of the cutting-wheel handle.

Some of the cutting elements of the prior art comprise a ceramic cutting tool with a semi-cylindrical handle, whereas along its length has a flat chamfered face and below the cutting-wheel, the handle being inserted and adjusted in its height in the through hole of the handle holder. The positioning of said handle to the handle holder is not very easy and quick, since once introduced in the through hole it must be rotated until the chamfered face faces the threaded end of the actuating lever of the ceramic cutting device, and, even more important, the fixation of the handle to the handle holder is not very firm, because the circular external face thereof can slide along the internal face of the through hole of the holder, even if the threaded end of the actuating lever is firmly pressing the chamfered face of the handle, as the force exerted during the cutting operation is of a very high magnitude and, with use, causes an axial deviation of the handle thus causing a lack of parallelism between the rotation plane and the cutting line.

That lack of parallelism compromises the cutting efficiency as can chip the breaking surface and also shorten the life of the cutting element, noting that the cost of ceramic coating is very high. The shortening of the useful life of the cutting element is not either a desirable factor, since such cutting devices have a substantial cost.

Different profiles for the cutting-wheel handle have been disclosed in some patent document, which could provide respective partial solutions to the above mentioned problems is provided.

One of said handle profiles is disclosed in U.S. Pat. No. 7,013,785B2, where the profile is still semi-cylindrical with a chamfered face, but with three longitudinally extending rebates extending over substantially the entire length of handle, which purpose is that of reducing a frequency of vibration during scoring of the ceramic piece. Although, said handle profile, when the handle is inserted in a through hole with a matching inner profile, improves the above mentioned positioning and fixation of the handle, the mechanical stress distribution through the three rebates and through the three corresponding matching rebates of the handle holder through hole makes that, with use, some wearing is produced causing some gaps between the handle external faces and the through hole internal faces, which causes the above cited axial deviation of the handle and, thus the lack of parallelism between the rotation plane and the cutting line.

Therefore, the geometry for the handle proposed in U.S. Pat. No. 7,013,785B2 is not very suitable for overcoming the above mentioned problems, surely because that was not the intention of the inventors of said handle, as the real intention was to reduce a frequency of vibration during scoring.

A different cutting-wheel handle profile is shown in European Community Design EM 700000002200105-0001 and in Mexican design MX702013000002715-0001, the latter claiming priority form the former. Said handle profile is an orthogonal profile having one longitudinal rebate extending over the length of handle and arranged at one of the eight faces of the profile, particularly on a face which is in a plane orthogonal to the rotation plane of the cutting wheel.

Two of the flat faces of the profile shown in said designs are parallel to each other and to the rotation plane of the cutting wheel, although none of the transversal ends of said parallel faces abuts to any other portion of the handle, i.e. no portion of the handle profile extends beyond each of said parallel faces in a direction orthogonal to said parallel faces. No curved portions are included in the handle profile shown in said designs.

Such a profile lacks of the benefits provided by curved portions, i.e. that of a better mechanical stress distribution, while doesn't either constitutes an optimal solution to the above mentioned problems related to the axial deviation of the handle and, thus the lack of parallelism between the rotation plane and the cutting line, as the orthogonal profile, with use, can be worn and thus slightly rounded.

Therefore, it is necessary to provide an alternative to the state of the art which covers the gaps found therein, particularly those associated to the existing cutting-wheel handle profiles, with respect to the axial deviation thereof and the parallelism between the rotation plane and the cutting line.

DESCRIPTION OF THE INVENTION

To that end, the present invention relates, in a first aspect, to a cutting tool for a ceramic cutting device, said cutting tool comprising, as known from the above indicated European and Mexican designs:
 a cutting-wheel handle which has, along at least half of its length, preferably along most of its length, an uniform cross-section with an outer contour including points arranged following two opposed straight rows; and
 a cutting wheel mounted on an end of the cutting-wheel handle to rotate along a rotation plane, said rotation plane being parallel or substantially parallel to both of said two opposed straight rows.

Contrary to the known cutting assemblies, particularly contrary to the one comprising a cutting-wheel handle with the orthogonal profile disclosed in the above mentioned designs, in the cutting tool of the first aspect of the present invention, in a characteristic manner, the outer contour of the uniform cross-section of the cutting-wheel handle also includes points arranged following at least one curved line segment of the edge of a circle enclosing an area into which said opposed straight rows lie.

For an embodiment, the outer contour of the uniform cross-section of the cutting-wheel handle includes points arranged following two curved line segments of the edge of said circle.

For another embodiment, the two curved line segments and/or the two opposed straight rows are arranged symmetrically with respect to a symmetry line parallel to the opposed straight rows.

According to another embodiment of the cutting tool of the first aspect of the invention, the outer contour of the uniform cross-section of the cutting-wheel handle also includes points arranged following at least a straight line segment, which, for a variant if said embodiment, is orthogonal to the two opposed straight rows and/or joins respective first ends of the two opposed straight rows.

Preferably, the first ends of the curved line segments are respectively joined to second ends of the opposed straight rows through respective joining tilted straight line segments which are tilted with respect to the opposed straight rows, and second ends of the curved line segments are joined by a respective recessed segment lying in the area enclosed by the circle.

For an embodiment of the cutting tool of the first aspect of the invention, the points arranged following each of the two opposed straight rows are joined only through points which also follow the respective straight row, thus forming a straight line segment. Therefore, the cutting-wheel handle has, along the length thereof which has the above mentioned uniform cross-section, two respective opposed external flat surfaces, each including a plurality of said straight line segments stacked upon each other.

For an alternative embodiment, the points arranged following each of the two opposed straight rows are joined through points which don't follow the respective straight row but which are arranged such that the average profile of the points following the straight row and the ones joining said points is a substantially straight path, such that the portion of the outer contour of the uniform cross-section including the straight row is a line which is not straight but follows a straight path. In other words, said "not straight line" is a line with topographic irregularities (rough, wavy, embossed, fringed, etc.) which follows a substantially straight path. Therefore, the cutting-wheel handle has, along the length thereof which has the above mentioned uniform cross-section, two respective opposed external surfaces having said topographic irregularities, each including a plurality of said not straight lines stacked upon each other. Said topographic irregularities provide a better frictional engagement with the corresponding inner face of the contour of the through hole of the cutting-wheel handle holder into which the cutting-wheel handle is to be mounted.

Generally, the end of the cutting-wheel handle on which the cutting wheel is mounted is a forked end having two parallel legs with respective opposed aligned through holes traversed with a shaft supporting the cutting wheel such that the cutting wheel can freely rotate about the shaft along said rotation plane.

In order to make said opposed through holes aligned with a high accuracy, higher than the one achieved with the conventional cutting-wheel handles, a new process is provided comprising sequentially drilling both holes during the same drilling step while firmly holding the cutting-wheel handle by clamping the same by the two respective opposed external surfaces (which are flat or with topographic irregularities, depending on the embodiment), which are parallel or substantially parallel to each other, such that the orthogonality of the rotation axis, i.e. of the alignment axis of the opposed through holes, is guaranteed, which assures the parallelism of the cutting line with the guided displacement of a support on which the cutting-wheel handle is mounted, during the ceramic cutting operation.

Said clamping is performed with a clamp having two opposed and relatively movable fingers, and preferably by abutting the free ends of said fingers against at least a portion of the tilted surfaces of the cutting-wheel handle formed by the above mentioned joining tilted straight line segments stacked upon each other, said abutting providing an even higher firmness for the holding of the cutting-wheel handle.

A second aspect of the invention concerns to a cutting-wheel handle holder, having a body comprising:
 a through hole for the insertion there through of a cutting-wheel handle; and
 a threaded hole running orthogonally to the longitudinal axis of said through hole and communicating the exterior of said body with the through hole;
 wherein the through hole, or a through hole of an adapter plug inserted there through, has a cross-section with a contour matching the contour of the cross-section of the cutting-wheel handle of the first aspect of the invention, where the faces of the contour of said through hole can be flat or have topographic irregularities, depending on the embodiment.

A third aspect of the invention concerns to a cutting assembly comprising the cutting tool of the first aspect and the cutting-wheel handle holder of the second aspect of the invention, wherein the cutting-wheel handle is mounted or to be mounted into the through hole of the body of the cutting-wheel handle holder.

A fourth aspect of the invention concerns to a ceramic cutting device comprising:
- a base;
- longitudinal guides mounted to the base;
- a support movably mounted on said longitudinal guides;
- the cutting assembly of the third aspect of the invention, wherein:
  - the body of the cutting-wheel handle holder is pivotably mounted to said support; and
  - the cutting-wheel handle of the cutting tool is mounted in the cutting-wheel handle holder, introduced in the through hole of the body; and
- an actuating lever with a threaded end introduced and engaged in the threaded hole of the body of the cutting-wheel handle holder, so as to immobilize the cutting-wheel handle of the cutting tool by pressing a surface thereof with the threaded end of the actuating lever.

The specific geometry of the cutting-wheel handle and of the through hole of the body of the cutting-wheel handle holder provides an engagement of the handle to the handle holder with a higher accuracy than with the known handle geometries, without the need of performing an axial adjustment, such that the cutting-wheel is perfectly aligned longitudinally and perpendicularly with respect to the base of the ceramic cutting device and thus with the ceramic piece to be cut supported on said base.

The implementation of the above described drilling process, closely associated to said specific geometry of the cutting-wheel handle, increases even more said alignment, as the obtained drilled holes supporting the shaft of the cutting-wheel are perfectly aligned with each other.

Therefore, the lack of parallelism between the rotation plane and the cutting line is completely overcome with the present invention.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF SEVERAL EMBODIMENTS

Different views of the cutting tool 2 of the first aspect of the invention are shown in the enclosed Figures, said cutting tool 2 comprising:
- a cutting-wheel handle 3 which has, along at least half of its length, an uniform cross-section with an outer contour including points arranged following two opposed straight rows and (for the illustrated embodiment) points arranged following two curved line segment S3, S4 of the edge of a circle (shown with a dashed line in FIG. 10a) enclosing an area into which said opposed straight rows lie; and
- a cutting wheel 4 (see FIGS. 3 to 9) mounted on an end of the cutting-wheel handle 3 to rotate along a rotation plane, said rotation plane being parallel or substantially parallel to both of said two opposed straight rows.

Figure 10A:
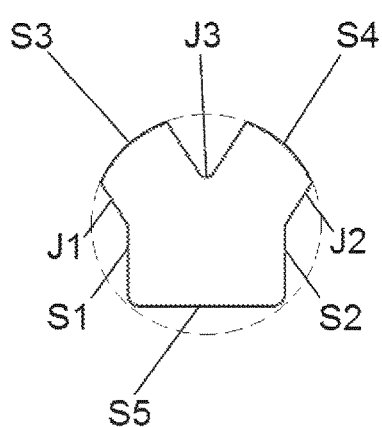
FIG. 10a shows a top view of the handle of the cutting tool of the first aspect of the invention, for the same embodiment than FIGS. 6 to 9, showing a contour which coincides with the contour of its cross-section along most of the length of the handle.
Figure 10B:
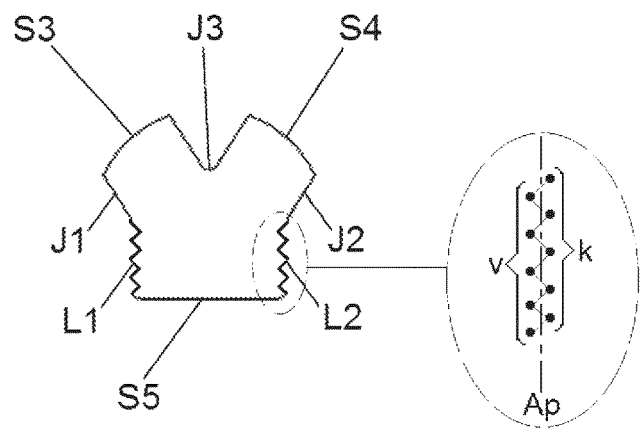
FIG. 10b shows a top view of the handle of the cutting tool of the first aspect of the invention showing a contour which coincides with the contour of its cross-section along most of the length of the handle, for alternative embodiment where the two opposed lines of the contour are not flat but wavy, together with a schematic and larger view of the points distribution through one of said wavy lines.
Figure 12:
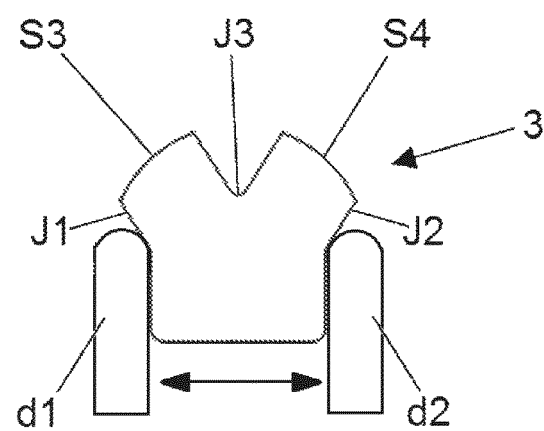
FIG. 12 shows the same top view of the handle of the cutting tool of the first aspect of the invention shown in FIG. 10a, and also two movable fingers of a clamp which are shown clamping the handle by the two opposed parallel faces and abutting against the tilted faces thereof, to firmly hold the handle.

Although FIGS. 10a, 10b and 12 show a top view of the handle and not its cross-section, the contour thereof coincides with the contour of its cross-section along most of the length of the handle, so the different segments of the cross-section contour have been indicated in FIGS. 10a, 10b and 12, as said segments are also included in said contour of the top view of the handle.

Particularly, regarding FIG. 10a, the contour there shown includes two opposed and parallel straight line segments S1, S2 formed by the two opposed straight rows, as for said embodiments all the points forming each of said straight line segments S1, S2 follow the respective straight row. Moreover, FIG. 10a and also FIG. 10b show the above mentioned curved line segments S3, S4, which are joined to each other by recessed segment J3 (lying in the area enclosed by the above mentioned circle) and joined to line segments S1, S2 (or to lines L1, L2) by tilted segments J1, J2, and also show a further straight line segment S5 orthogonal and joining the two opposed straight line segments S1, S2, or the two opposed lines L1, L2 for the embodiment of FIG. 10b.

Figure 7:
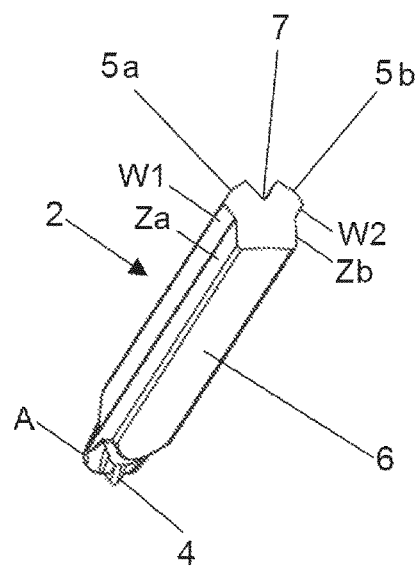
Figure 8:
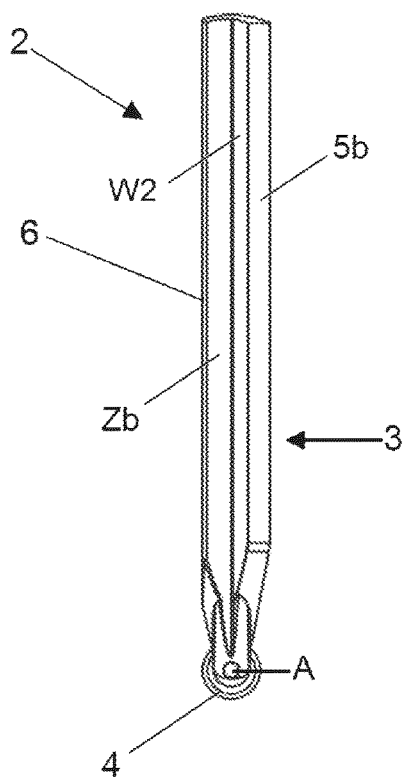
FIG. 8 shows a side view of the cutting tool of the first aspect of the invention, for the same embodiment than FIGS. 5 and 6.
Figure 11:
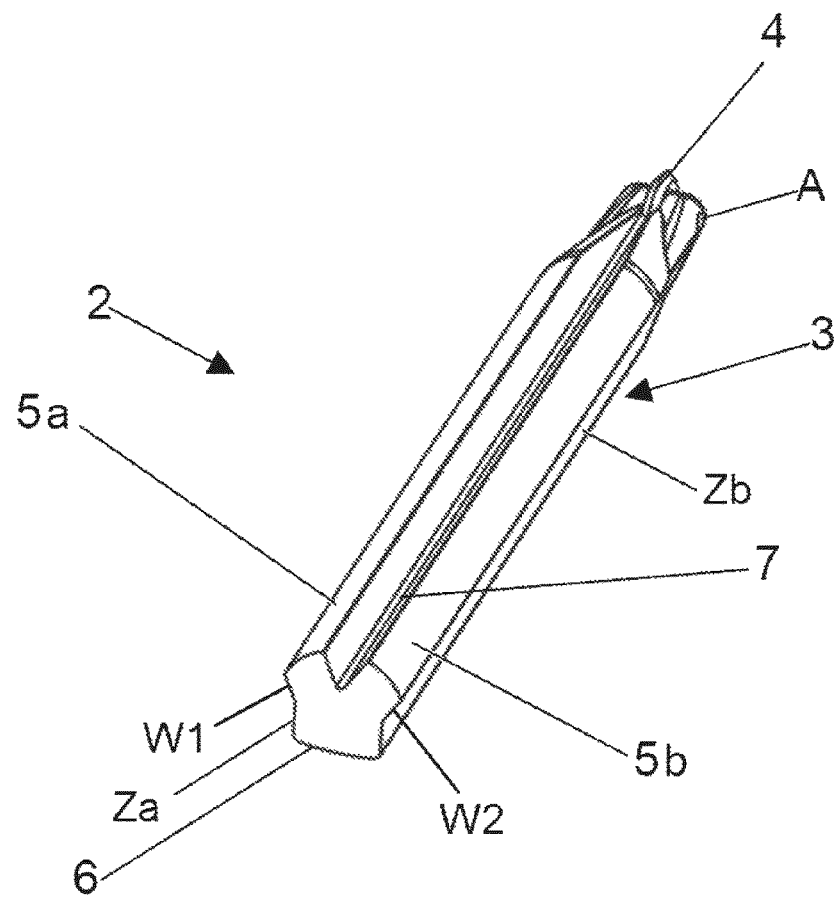
FIG. 11 is top-front perspective view of the cutting tool of the first aspect of the invention, for the same embodiment than FIGS. 6 and 7.

As indicated above, and shown in the Figures, most of the length of the handle 3 has a uniform cross-section, i.e. a plurality of identical cross-sections stacked upon each other, thus a plurality of each of said line segments S1, S2 (or lines L1, L2), S3, S4, S5, J1, J2, J3 are stacked upon each other forming respective surfaces Za, Zb, 5a, 5b, 6, W1, W2 and 7, as best shown in FIGS. 7 and 11.

For the shown embodiments, the tilted line segments J1, J2 (and therefore, tilted surfaces W1, W2) are tilted about 58° with respect to segment S5, and the recessed segment J3 (and, therefore, recessed surface or groove 7) has a V-shape and is formed out of an arch portion of about 64°. Other angular values are also possible, for other embodiments (not shown), and also a recessed surface 7 with a different shape than the one shown is also possible, for other embodiments.

The embodiment of FIG. 10b differs from the one of FIG. 10a in that, instead of two opposed straight line segments it includes two opposed wavy lines L1, L2, which waves follow a straight path. In other words, as graphically shown in the right detail of FIG. 10b, for line L2, each of said lines L1, L2 includes points v (at the valleys of the waves) arranged following respective straight rows joined through points k (at the peaks of the waves) which don't follow the same straight row than points v, but which are arranged such that the average profile Ap of all of the points, v and k, is a substantially straight path, such that the portion of the outer contour of the uniform cross-section including the straight row is a line L1, L2 which is not straight but follows a straight path or straight trajectory.

A clearly shown in FIGS. 10a and 10b, the uniform cross-section of the handle 3 is symmetric with respect to a symmetry line parallel to the opposed straight line segments S1, S2, or to the straight paths Ap for the embodiment of FIG. 10b.

Figure 9:
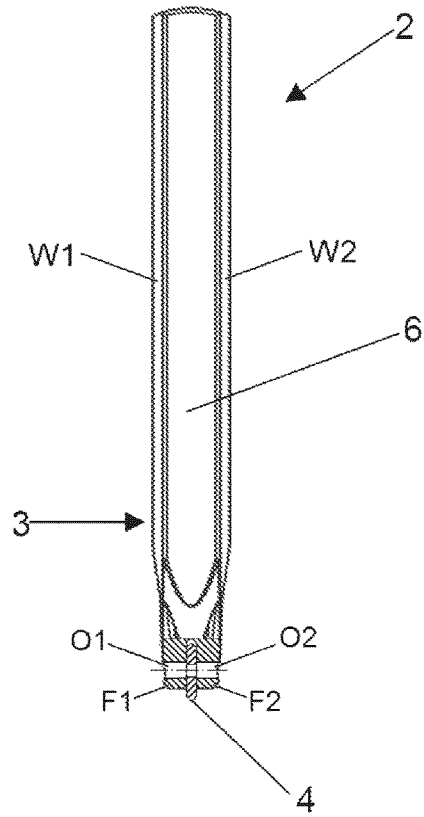
FIG. 9 shows a front view of the cutting tool of the first aspect of the invention, for the same embodiment than FIG. 8, where the cutting-wheel and the end of the handle where it is mounted is shown in cross-section.

As shown in FIG. 9, the end of the cutting-wheel handle 3 on which the cutting wheel 4 is mounted is a forked end having two parallel legs F1, F2 with respective opposed aligned through holes O1, O2 to be traversed with a shaft A (not shown in FIG. 9, for clarity sake, but shown in FIG. 8) supporting the cutting wheel 4 such that the cutting wheel 4 can freely rotate about the shaft A along said rotation plane.

As stated in a previous section, the particular geometry of the profile of the handle 3 has, among others, the advantage of collaborating in obtaining a very well aligned through holes O1, O2 and thus in assuring the parallelism of the cutting line with the guided displacement of the cutting tool.

FIG. 12 graphically explains why the geometry of the handle 3 collaborates in assuring said alignment of the through holes O1, O2, as it shows two opposed relatively moveable fingers d1, d2 of a clamp firmly holding the handle, where the fingers d1, d2 exert a compression force on the two opposed parallel faces Za, Zb, while the free ends of the fingers d1, d2 abut against a portion of the tilted surfaces W1, W2 formed by the above mentioned joining tilted straight line segments J1, J2 stacked upon each other, said abutting providing an even higher firmness for the holding of the cutting-wheel handle 3, for preforming a drilling process comprising sequentially drilling both holes O1, O2 during the same drilling step while firmly holding the cutting-wheel handle as described above. Of course, different processes can be carried out, different to that drilling process, which can take profit of such a firm holding of the handle 3.

FIGS. 2 to 5 shows an embodiment of the second aspect of the invention, i.e. of the cutting-wheel handle holder, which has a body 10 comprising:

a tubular portion 9 with a through hole 8 for the insertion there through of a cutting-wheel handle 3; and
a threaded hole 10a running orthogonally to the longitudinal axis of said through hole 8 and communicating the exterior of said body 10 with the through hole 8.

Figure 5:
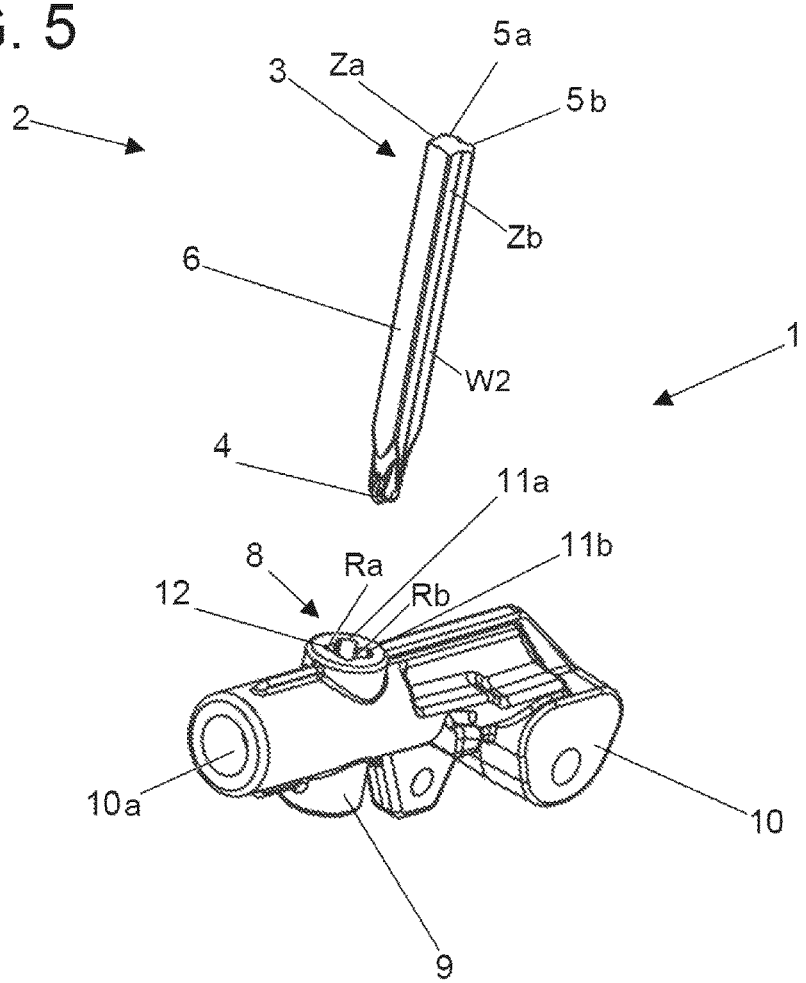
FIG. 5 is a further front perspective view of the cutting assembly of the third aspect of the invention, for the same embodiment than the one of FIGS. 2, 3 and 4, which shows the cutting tool and the cutting-wheel handle holder in an unmounted situation.
Figure 6:
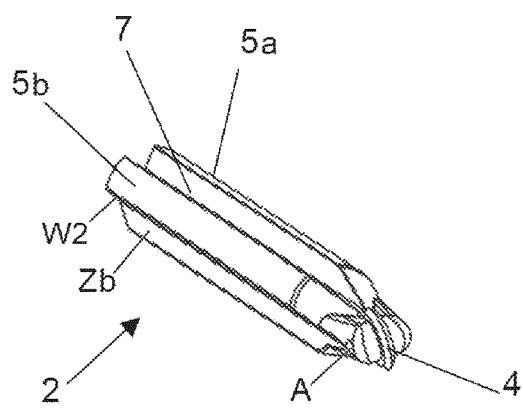
FIGS. 6 and 7 show respective perspective views, taken from different viewpoints, of the cutting tool of the first aspect of the invention, for an embodiment.

As shown in FIG. 5, through hole 8 (or, for a not shown embodiment, a through hole of an adapter plug inserted there through), has a cross-section with a contour matching the contour of the cross-section of the cutting-wheel handle 3 of the first aspect of the invention. Said cross-section is uniform along the length of tubular portion 9.

FIGS. 2 to 5 also show the third aspect of the invention, for an embodiment, i.e. a cutting assembly 1 including the cutting tool 2 and the cutting-wheel handle holder.

A cutting assembly, comprising the cutting tool of any of claims 1 to 9 and the cutting-wheel handle holder of claim 10.

Figure 1:
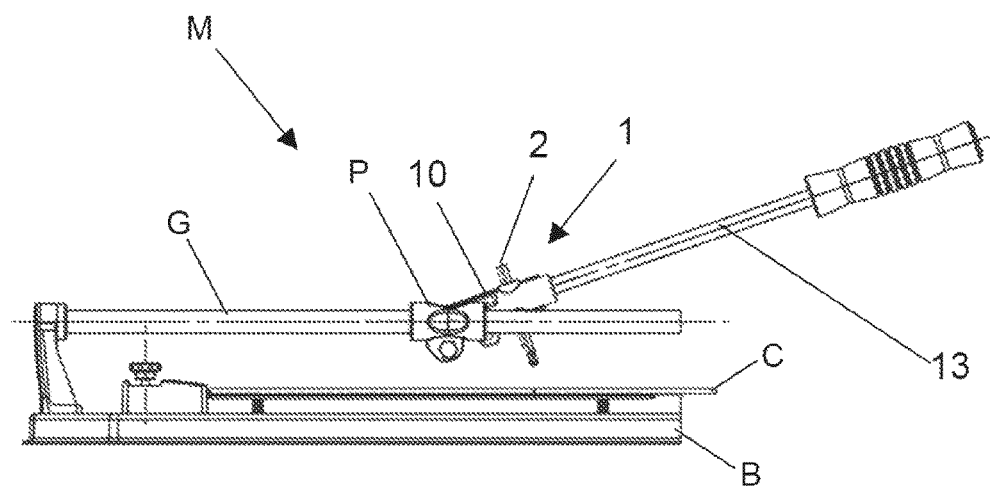
FIG. 1 is a side view of the ceramic cutting device of the fourth aspect of the invention, for an embodiment.
Figure 2:
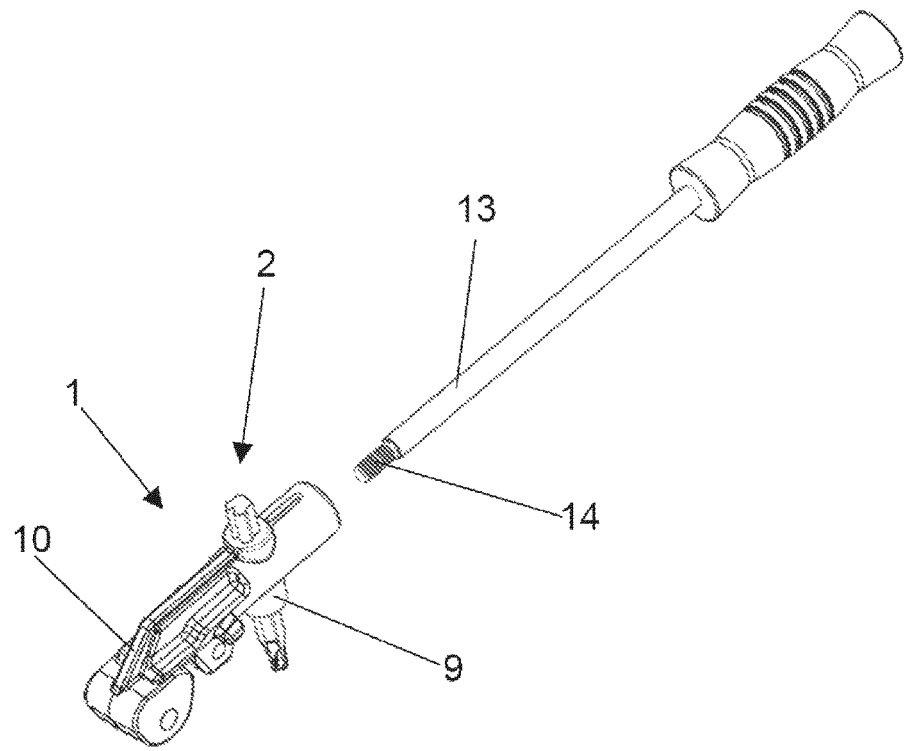
FIG. 2 is a perspective view showing the cutting assembly of the third aspect of the invention, in a mounting situation, and the actuating lever of the ceramic cutting device of the fourth aspect of the invention, for an embodiment.
Figure 3:
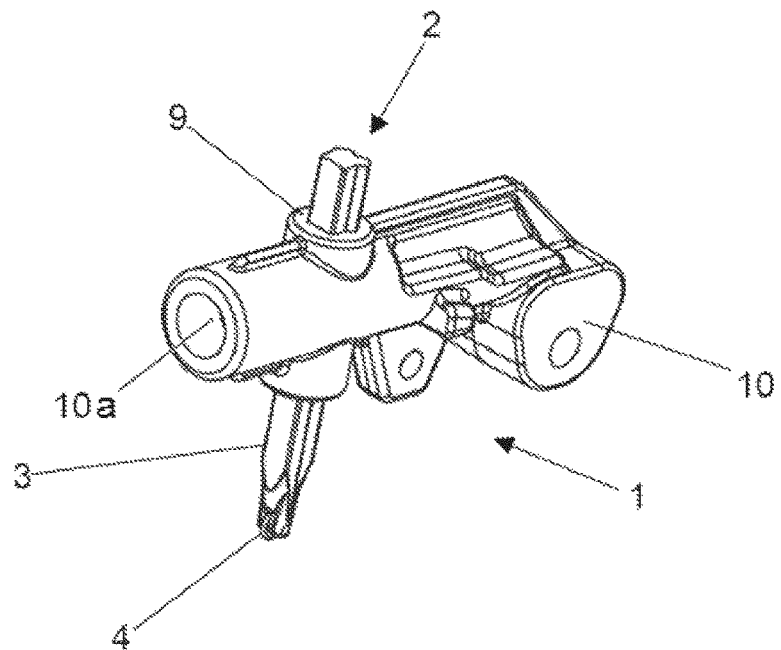
FIG. 3 is a front perspective view of the cutting assembly of the third aspect of the invention, for the same embodiment than the one of FIG. 2.
Figure 4:
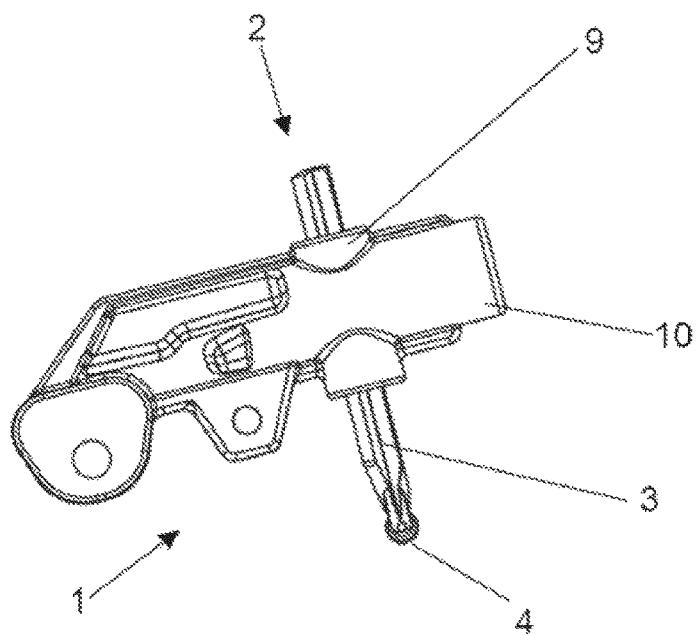
FIG. 4 is a side view of the cutting assembly of the third aspect of the invention, for the same embodiment than the one of FIGS. 2 and 3.

Finally, FIG. 1 shows an embodiment of the ceramic cutting device 1 of the fourth aspect of the invention, comprising:

a base B, supporting a ceramic plate C to be cut;
longitudinal guides G (only one guide is shown, the other is hidden by the one shown) mounted to the base B;
a support P movably mounted on said longitudinal guides G, to slide there along during the cutting process;
the cutting assembly of claim the third aspect of the invention, wherein:
  the body 10 of the cutting-wheel handle holder is pivotably mounted to the support P; and
  the cutting-wheel handle 3 of the cutting tool 2 is mounted in the cutting-wheel handle holder, introduced in the through hole 8 of body 10; and
an actuating lever 13 with a threaded end 14 (shown in FIG. 2) introduced and engaged in the threaded hole 10a (see FIGS. 3 and 5) of the body 10 of the cutting-wheel handle holder, so as to immobilize the cutting-wheel handle 3 of the cutting tool by pressing a surface thereof, particularly flat surface 6, with the threaded end 14 of the actuating lever 13, when the cutting-wheel handle 3 is position at the desired height.

A person skilled in the art could introduce changes and modifications in the embodiments described without departing from the scope of the invention as it is defined in the attached claims.

The invention claimed is:

1. A cutting tool for a ceramic cutting device, the cutting tool comprising:
  a cutting-wheel handle which has, along at least half of its length, a uniform cross-section with an outer contour including two opposed uniformly-spaced straight rows; and
  a cutting wheel mounted on an end of the cutting-wheel handle to rotate along a rotation plane, the rotation plane being parallel or substantially parallel to both of the two opposed uniformly-spaced straight rows;
  wherein the outer contour of the uniform cross-section of the cutting-wheel handle also includes two curved line segments that are coextensive along their entire length with an outside edge of a same circle enclosing an area into which the two opposed uniformly-spaced straight rows lie, wherein the two curved line segments and/or the two opposed uniformly-spaced straight rows are arranged symmetrically with respect to a symmetry line parallel to the two opposed uniformly-spaced straight rows;
  wherein the outer contour of the uniform cross-section of the cutting-wheel handle also includes at least a straight line segment which is orthogonal to the two opposed uniformly-spaced straight rows and/or joins respective first ends of the two opposed uniformly-spaced straight rows;

wherein first ends of the curved line segments are respectively joined to second ends of the two opposed uniformly-spaced straight rows through respective joining straight line segments which are tilted with respect to the two opposed uniformly-spaced straight rows, and second ends of the curved line segments are joined by a respective recessed segment lying in the area enclosed by the same circle; and wherein the first ends of the curved line segments are mutually spaced at a distance larger than a distance at which the entirety of the two opposed uniformly-spaced straight rows are mutually spaced; and wherein the outer contour of the uniform cross-section of the cutting-wheel handle facilitates holding by two movable fingers of a clamp which fingers press against the two opposed uniformly-spaced straight rows and abut against the tilted joining straight line segments.

2. The cutting tool according to claim 1, wherein each of the two opposed uniformly-spaced straight rows form a straight line segment.

3. The cutting tool according to claim 1, wherein each of the two opposed uniformly-spaced straight rows are defined within a wavy path.

4. The cutting tool according to claim 1, wherein the end of the cutting-wheel handle on which the cutting wheel is mounted is a forked end having two parallel legs with respective opposed aligned through holes traversed with a shaft supporting the cutting wheel such that the cutting wheel can freely rotate about the shaft along the rotation plane.

5. A cutting-wheel handle holder, having a body comprising:
a through hole for the inserting there through a cutting-wheel handle; and
a threaded hole running orthogonally to a longitudinal axis of the through hole and communicating the exterior of the body with the through hole;
wherein the through hole, or a through hole of an adapter plug inserted there through, has a cross-section with a contour matching a contour of a cross-section of a cutting-wheel handle of a cutting tool for a ceramic cutting device, the cutting tool comprising:
a cutting-wheel handle which has, along at least half of its length, a uniform cross-section with an outer contour including two opposed uniformly-spaced straight rows; and
a cutting wheel mounted on an end of the cutting-wheel handle to rotate along a rotation plane, the rotation plane being parallel or substantially parallel to both of the two opposed uniformly-spaced straight rows;
wherein the outer contour of the uniform cross-section of the cutting-wheel handle also includes two curved line segments that are coextensive along their entire length with an outside edge of a same circle enclosing an area into which the two opposed uniformly-spaced straight rows lie, wherein the two curved line segments and/or the two opposed uniformly-spaced straight rows are arranged symmetrically with respect to a symmetry line parallel to the opposed straight rows;
wherein the outer contour of the uniform cross-section of the cutting-wheel handle also includes at least a straight line segment which is orthogonal to the two opposed uniformly-spaced straight rows and/or joins respective first ends of the two opposed uniformly-spaced straight rows;

wherein first ends of the curved line segments are respectively joined to second ends of the two opposed uniformly-spaced straight rows through respective joining straight line segments which are tilted with respect to the two opposed uniformly-spaced straight rows, and second ends of the curved line segments are joined by a respective recessed segment lying in the area enclosed by the same circle;

wherein said first ends of the curved line segments are mutually spaced a distance larger than a distance at which said second ends the entirety of the two opposed uniformly-spaced straight rows are mutually spaced; and wherein the outer contour of the uniform cross-section of the cutting-wheel handle facilitates holding by two movable fingers of a clamp which fingers press against the two opposed uniformly-spaced straight rows and abut against the tilted joining straight line segments.

6. A cutting assembly comprising:
a cutting tool for a ceramic cutting device, the cutting tool comprising:
a cutting-wheel handle which has, along at least half of its length, a uniform cross-section with an outer contour including two opposed straight rows; and
a cutting wheel mounted on an end of the cutting-wheel handle to rotate along a rotation plane, the rotation plane being parallel or substantially parallel to both of the two opposed straight rows;
wherein the outer contour of the uniform cross-section of the cutting-wheel handle also includes two curved line segments that are coextensive along their entire length with an outside edge of a same circle enclosing an area into which the opposed straight rows lie, wherein the two curved line segments and/or the two opposed straight rows are arranged symmetrically with respect to a symmetry line parallel to the opposed straight rows;
wherein the outer contour of the uniform cross-section of the cutting-wheel handle also includes at least a straight line segment which is orthogonal to the two opposed straight rows and/or joins respective first ends of the two opposed straight rows;
wherein first ends of the curved line segments are respectively joined to second ends of the opposed straight rows through respective joining straight line segments which are tilted with respect to the opposed straight rows, and second ends of the curved line segments are joined by a respective recessed segment lying in the area enclosed by the same circle; and
wherein said first ends of the curved line segments are mutually spaced a distance larger than a distance at which said second ends of the opposed straight rows are mutually spaced; and
a cutting-wheel handle holder having a body comprising:
a through hole for the inserting there through a cutting-wheel handle;
a threaded hole running orthogonally to a longitudinal axis of the through hole and communicating the exterior of the body with the through hole;
wherein the through hole, or a through hole of an adapter plug inserted there through, has a cross-section with a contour matching the contour of the cross-section of the cutting-wheel handle of the cutting tool; and wherein the outer contour of the uniform cross-section of the cutting-wheel handle facilitates holding by two movable fingers of a clamp which fingers press against the two opposed straight rows and abut against the tilted joining straight line segments.

7. A ceramic cutting device, comprising:
a base;
longitudinal guides mounted to the base;
a support movably mounted on the longitudinal guides;
a cutting assembly comprising:
  a cutting tool for the ceramic cutting device, the cutting tool comprising:
    a cutting-wheel handle which has, along at least half of its length, a uniform cross-section with an outer contour including two opposed straight rows; and
    a cutting wheel mounted on an end of the cutting-wheel handle to rotate along a rotation plane, the rotation plane being parallel or substantially parallel to both of the two opposed straight rows;
      wherein the outer contour of the uniform cross-section of the cutting-wheel handle also includes two curved line segments that are coextensive along their entire length with an outside edge of a same circle enclosing an area into which the opposed straight rows lie, wherein the two curved line segments and/or the two opposed straight rows are arranged symmetrically with respect to a symmetry line parallel to the opposed straight rows;
      wherein the outer contour of the uniform cross-section of the cutting-wheel handle also includes at least a straight line segment which is orthogonal to the two opposed straight rows and/or joins respective first ends of the two opposed straight rows;
      wherein first ends of the curved line segments are respectively joined to second ends of the opposed straight rows through respective joining straight line segments which are tilted with respect to the opposed straight rows, and second ends of the curved line segments are joined by a respective recessed segment lying in the area enclosed by the same circle; and
      wherein said first ends of the curved line segments are mutually spaced a distance larger than a distance at which said second ends of the opposed straight rows are mutually spaced; and
  a cutting-wheel handle holder having a body comprising:
  a through hole for the inserting there through a cutting-wheel handle; and
    a threaded hole running orthogonally to a longitudinal axis of the through hole and communicating the exterior of the body with the through hole;
    wherein the through hole, or a through hole of an adapter plug inserted there through, has a cross-section with a contour matching the contour of the cross-section of the cutting-wheel handle of the cutting tool;
  wherein the body of the cutting-wheel handle holder is pivotably mounted to the support; and
    wherein the cutting-wheel handle of the cutting tool is mounted in the cutting-wheel handle holder, introduced in the through hole of body such that the outer contour of the uniform cross-section of the cutting-wheel handle facilitates holding by two movable fingers of a clamp which fingers press against the two opposed straight rows and abut against the tilted joining straight line segments; and
  an actuating lever with a threaded end introduced and engaged in the threaded hole of the body of the cutting-wheel handle holder, so as to immobilize the cutting-wheel handle of the cutting tool by pressing a surface thereof with the threaded end of the actuating lever.

\* \* \* \* \*